GUIDE FOR MOVING TAPE

Filed March 6, 1959

NESTOR N. HACK
GEORGE M. HAYASHIDA
*INVENTOR.*

BY Byard G. Nilsson

United States Patent Office 2,950,072
Patented Aug. 23, 1960

2,950,072

GUIDE FOR MOVING TAPE

George M. Hayashida, San Pedro, and Nestor R. Hack, Gardena, Calif., assignors to The Bendix Corporation, a corporation of Delaware Filed Mar. 6, 1959, Ser. No. 797,711

6 Claims. (Cl. 242—76)

Figures 1, 2:
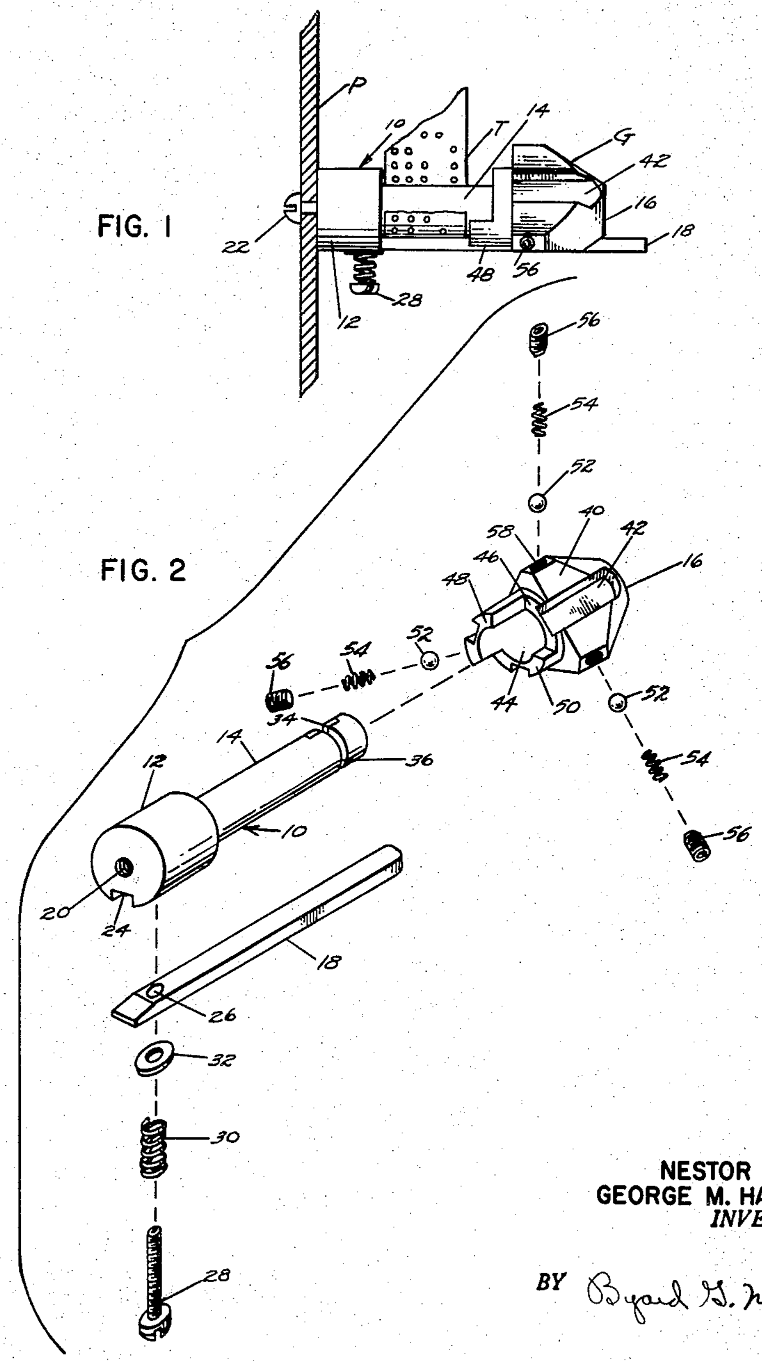

The present invention relates to a tape guide and more particularly to a guide for supporting tape as the tape is moved.

Various types of tape, e.g. magnetic tape, and punched-paper tape, have come into widespread use for registering numerical information and other data. Conventionally, information is recorded upon, and sensed from tape as the tape is moved relative to recording and sensing means. Therefore, the tape is usually passed between a pair of reels moving over recording and sensing means as it passes from one reel to the other. Of course, various tape guides are required to assure that the tape is properly positioned with respect to the sensing and recording devices. In general, it is desirable to provide a tape guide in which the tape is held. Furthermore, ease of inserting the tape in the tape guide is an important consideration.

Machines which employ recording tape are sometimes capable of using different sizes of tape. For example, punched-paper tape machines may be capable of operating with tapes of different widths. Of course, wider tapes are normally capable of registering a greater amount of information in any given length of tape. As a result, it is desirable to provide a tape guide which is capable of operation in conjunction with various widths of tape.

An object of the present invention is to provide an improved tape guide which is capable of operation in conjunction with various widths of tape, and which incorporates means for holding the tape in position which may be easily displaced as the tape is inserted in the guide.

These and other objects of the present invention will become apparent from a consideration of the following taken in conjunction with the drawings, wherein:

Figure 1 is a plan view of a tape guide constructed in accordance with the present invention; and Figure 2 is an exploded perspective view of the tape guide of Figure 1.

Referring now to Figure 1 the tape guide G is shown mounted upon a panel P to support and guide a section of tape T. The guide G includes an elongate member 10 which includes two integrally-formed cylindrical sections 12 and 14, which have a cap member 16 and an arm 18 mounted thereon. The elongate member 10 has a threaded bore 20 at the axis of the section 12. The bore 20 receives a screw 22 which passes through a bore in panel P and thereby affixes the guide G to the panel P.

The cylindrical section 12 also contains a slot 24 parallel to the axis of the section 12, which slot receives the arm 18. The arm 18 may be generally rectangular in cross section and extends beyond the elongate member 10. The arm 18 contains a bore 26 for receiving a screw 28 which also passes through a coil spring 30 and a washer 32 and is received in a radially-extending threaded bore (not shown) in the cylindrical section 12.

The cylindrical section 14 of the elongate member 10 has a slot 34 cut in one end which is parallel to the axis of the section 14. An annular detent 36 is also formed in the section 14 which intersects the slot 34.

The cap member 16 is generally tapered from three similar surfaces 40. Each of the surfaces 40 include a slot, recess or groove 42 for receiving the arm 18. The cap member 16 has a bore 44 therein for receiving the cylindrical section 14 of the elongate member 10. Adjacent the bore 44, the cap member 16 includes three integrally-formed segments 46, 48 and 50, each of which extends to a different depth on the elongate member 10.

The cap member 16 also includes three sets of setting means each including a ball 52, a spring 54 and a set screw 56. These elements are positioned in sets in threaded bores 58 equally spaced about the cap member 16. As a result, the balls 52 lie partially in the bore 44, and in the assembled guide extend into the annular detent 36 of the cylindrical section 14 whereby to hold the cap member on the elongate member 10. Also, the balls 52 may individually engage the slot 34 of the elongate member 10 whereby to set the cap member 16 in any of three angularly-offset positions with respect to the elongate member 10. The cap member 16 is locked in each of the three possible positions by the arm 18 engaging one of the grooves 42.

In using the guide of the present invention in conjunction with a section of tape T, the cap member 16 is positioned so that the exposed surface of the cylindrical section 14 over which the tape T passes is of a length essentially coinciding to the width of the tape T. That is, in the event a narrow tape is to be used, the cap member 16 is positioned so that the long segment 48 is adjacent the tape T so that the exposed portion of the cylindrical section 14 over which the tape passes is generally similar to the width of the tape. Similarly, if a wide tape is to be used the short segment 46 is positioned adjacent the tape whereby to provide a larger portion of the cylindrical section 14 to engage the tape.

The adjustment of the cap member 16 to the proper position is effected by lifting the arm 18 from one of the slots 42 and applying sufficient force to the cap member 16 to cause the locked ball 52 to be forced from the slot 34 permitting the cap member to be revolved until the following ball 52 falls into the slot 34. The cap member 16 is revolved in this manner until the desired segment is adjacent the portion of the section 14 which will carry the tape. The arm 18 is then released to fall into one of the grooves 42 thereby locking the cap member 16 in position with respect to the elongate member 10. A section of tape is next very simply placed over the guide G by simply slipping the tape between the arm 18 and the cap member 16 whereby to lift the arm 18 out of the groove 42 thereby permitting the tape to be positioned over the cylindrical section 14. Of course, when the tape is so positioned, the arm 18 falls back into the groove 42 maintaining the cap member 16 locked in position.

An important feature of the present invention resides in the ease with which the guide of the present invention may be adapted to operate in conjunction with tape of various sizes.

Another important feature of the present invention resides in the ease with which tape may be placed over the guide.

From the foregoing, it will be apparent to those skilled in the art that the present invention provides an improved tape guide. It will also be apparent that variations may be made in the guide without departing from the novel features thereof. Consequently, the present invention is not to be limited to the particular arrangement herein described and shown except as defined by the appended claims.

We claim:

1. A guide for supporting tape as said tape is moved over said guide comprising: an elongate member adapted to have one end affixed, whereby said elongate member is supported transverse to said tape; and a cap member rotatively affixed upon another end of said elongate member whereby to have a plurality of set positions relative to said elongate member, said cap member having a plurality of segments which extend to cover a different amount of said elongate member whereby different sizes of said tape may be guided over an uncovered portion of said elongate member.

2. Apparatus according to claim 1 wherein said other end of said elongate member has an annular detent encircling said elongate member and a parallel solt intersecting said detent, and wherein said cap member includes a plurality of spring-lock members for engaging said detent and said slot whereby to set said cap member in a plurality of different positions relative to said elongate member.

3. Apparatus according to claim 1 further including an arm; and spring mounting means for pivotally affixing said arm to extend parallel to said elongate member and urge said arm to engage said cap member whereby said arm may be moved to position said tape over said elongate member.

4. Apparatus according to claim 3 wherein said cap member is tapered away from said elongate member to facilitate positioning said tape in said guide.

5. Apparatus according to claim 3 wherein said cap member contains a plurality of recesses for receiving said arm to lock said cap member in a plurality of different positions relative to said elongate member.

6. Apparatus according to claim 5 wherein said other end of said elongate member has an annular detent encircling said elongate member and a parallel slot intersecting said detent, and wherein said cap member includes a plurality of spring-lock members for engaging said detent and said slot whereby to set said cap member in a plurality of different positions relative to said elongate member.

References Cited in the file of this patent

UNITED STATES PATENTS

| | | |
|---|---|---|
| 2,152,118 | Walter et al. | Mar. 28, 1939 |
| 2,297,525 | Anheuser | Sept. 29, 1942 |
| 2,448,659 | Champion | Sept. 7, 1948 |